April 6, 1965     R. L. BICKEL     3,176,840

AUTOMATIC SORTING SYSTEM

Filed Feb. 4, 1963     6 Sheets-Sheet 1

INVENTOR
Richard L. Bickel

BY
ATTORNEY

INVENTOR
Richard L. Bickel

ATTORNEY

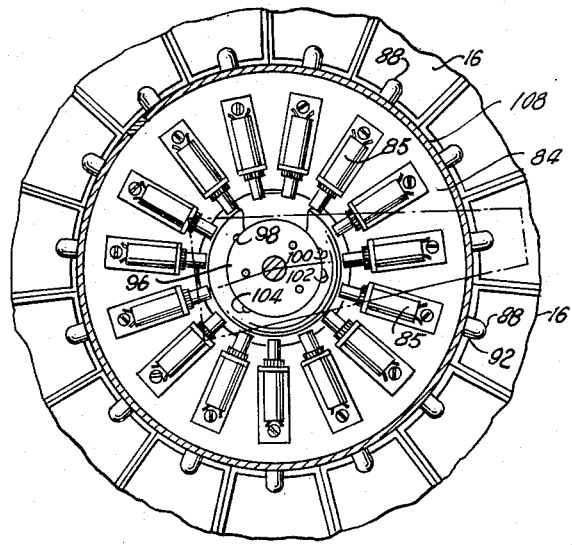
Fig. 8
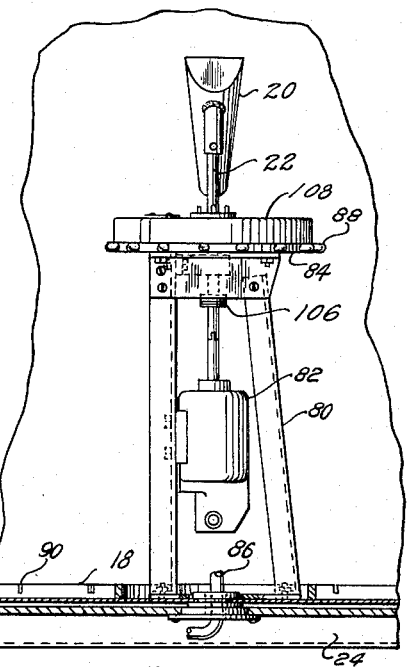
Fig. 10
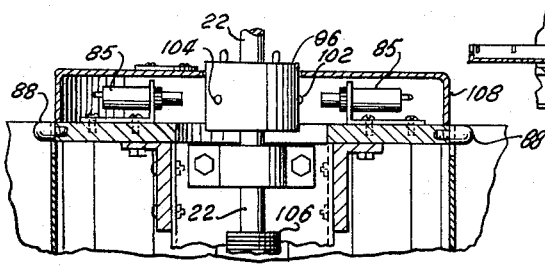
Fig. 9
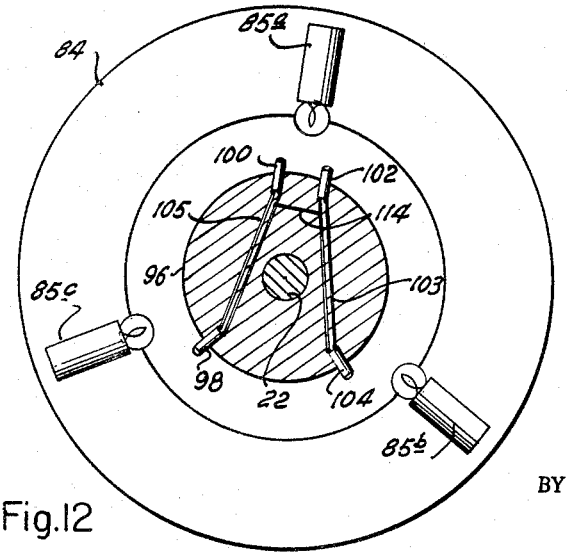
Fig. 11
Fig. 12
INVENTOR
Richard L. Bickel
BY 
ATTORNEY INVENTOR.
Richard L. Bickel INVENTOR.
Richard L. Bickel

United States Patent Office 3,176,840
Patented Apr. 6, 1965

3,176,840
AUTOMATIC SORTING SYSTEM
Richard L. Bickel, Dallas, Tex., assignor to Atlantis Electronics Corporation, Garland, Tex., a corporation of Texas
Filed Feb. 4, 1963, Ser. No. 255,829
9 Claims. (Cl. 209—74)

The present invention relates to sorting systems and more particularly to a sorting system for use in conjunction with testing apparatus to segregate the items tested in accordance with the result of the test.

In large scale manufacture of many devices and elements, it is impractical to manufacture each individual device within extremely close tolerances. It is, therefore, common to manufacture a group of devices utilizing substantially the same process and thereafter test the individual devices for purposes of classifying them into groups whose characteristics fall within acceptable limits or above or below such limits. Such a practice is especially common in the manufacture of electronic components such as coils, condensers, resistors, diodes, transistors, etc.

For example, four or more different type of transistors may result from a single production run. The only difference in the various types of transistors resulting from the production run may be, for example, a different range of current amplification factors or a difference in collector breakdown voltage or differences in one of the other transistor parameters which are considered critical. Although each of the transistors is made using identical processes to the greatest extent possible, even small differences in the amount of impurity material diffused into the semiconductor body or a small heat differential in the diffusing furnaces can produce different device characteristics. Thus, it is known statistically that varying percentages of each of several different type devices will be obtained from each production run.

In the early days of the semiconductor industry, the testing and sorting of the completed devices was a manually performed operation and, therefore, one that was slow, costly and subject to the frailties of human error. Many items of test equipment and sorting equipment for accomplishing the desired classification have been devised. However, the sorting mechanisms available at the present time have generally been found lacking in one or more respects, such as reliablility or speed of operation.

The present invention provides a sorting system for use in conjunction with a testing apparatus to sort items tested in accordance with the results of the test. In its basic form, the sorting apparatus of the present invention comprises a plurality of storage bins for receiving the items of different classification and a signal source associated with each of the storage bins. One of the signal sources is energized responsive to the indication of the presence of an item of one classification at the test station. Means are provided for conveying the item tested to the storage bin associated with the signal source that is energized.

According to one preferred embodiment of the invention, the storage bins are arranged in a circular configuration and the signal source is a lamp. Positioned in the axis of the cylinder defined by the bins is a shaft driven by an electric motor. The shaft carries a plurality of photocells which sense the presence of light emanating from one of the lamps and produce a signal which is effective to align a spout carried by the shaft with the bin associated with the particular lamp which is lit.

In testing certain devices, such as transistors, wherein it is normally desirable for an operator to insert the leads of the transistor into a test socket, means comprising a lamp and a photocell are provided for controlling the tester in conjunction with signals generated by the sorter control circuitry. A novel mechanism for ejecting the transistor under test from the test socket is also provided.

Although the sorter provided by the present invention is described with regard to particular embodiments utilizing the above mentioned transistor ejection mechanism and test control means, the sorter can also advantageously be used with many other types of testing apparatus and in conjunction with other types of material handling apparatus. Thus, for example, if the sorting mechanism provided by the present invention is utilized in conjunction with a diode test set, it will frequently be more practical to utilize a vibrating unit for handling the diodes. A vibrator suitable for such use is manufactured under the registered trademark, "Syntron," by the Syntron Company. The vibrating unit drops the diodes to be tested into a loading chute which automatically feeds the diodes into a rotating test head of the type incorporated into test equipment, such as the T-501 tester, sold by Atlantis Electronics Corporation of Garland, Texas, assignee of the present invention. After completion of the test, the diode passes from the test head to the spout. The test equipment provides a signal or ground, causing one of the lamps to be lit in accordancce with the diode parameters, and the photocells produces a signal which is effective to control the angular position of the motor shaft for alignment of the spout with the lit lamp. The diode tested is thereby conveyed to the desired bin.

Many objects and advantages of the present invention will become apparent to those skilled in the art as the following detail description of the same unfolds when taken in conjunction with the appended drawings wherein like reference numerals denote like parts and in which:

FIGURE 8 is a fragmentary view taken along line 8—8 of FIGURE 1 and illustrating the arrangement of the lamps which serve as signal sources in greater detail;

FIGURE 9 is a fragmentary view taken along line 9—9 of FIGURE 7 that illustrates the relationship between the lamps and the photocells which provides signal for controlling the position of the shaft;

FIGURE 10 is a view illustrating the preferred arrangement for mounting the motor and rotatable spout;

FIGURE 11 is a perspective view illustrating a preferred form of bin for use in practicing the present invention;

FIGURE 12 is a view similar to FIGURE 8 but illustrating the electrical connection between the photocells and the manner in which one of the photocells being lit controls the position of the shaft;

Figure 15:
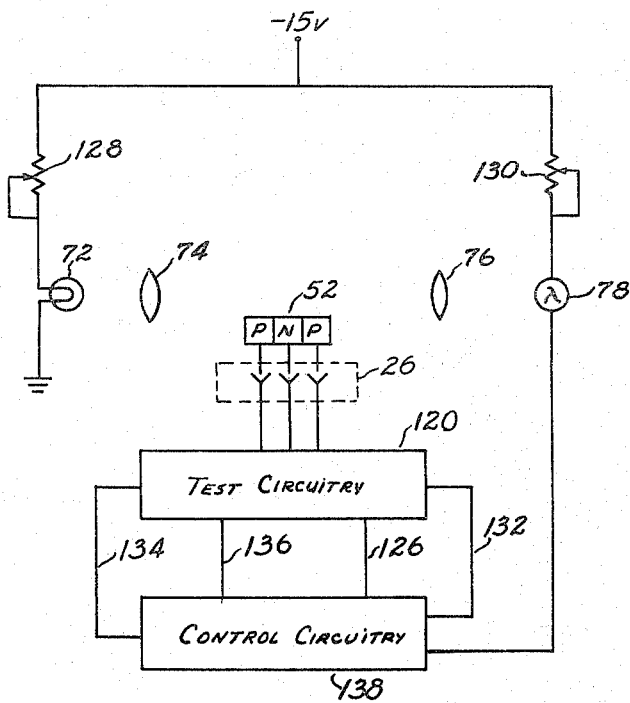
Figure 16:
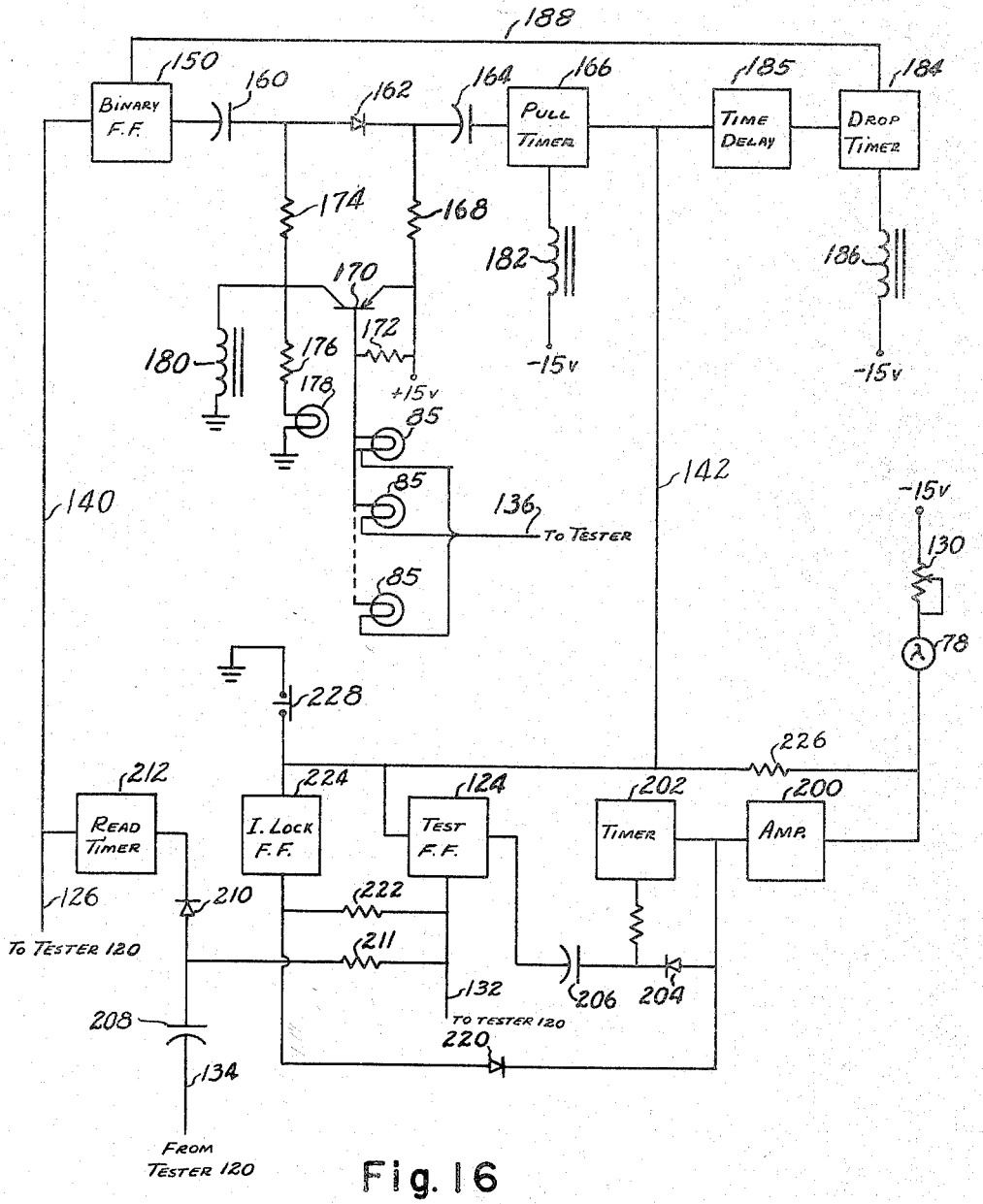

FIGURE 15 diagrammatically shows the electrical relationship between the various elements provided according to this preferred embodiment of the invention;

FIGURE 16 diagrammatically illustrates the sorter control system; and

Figure 17:
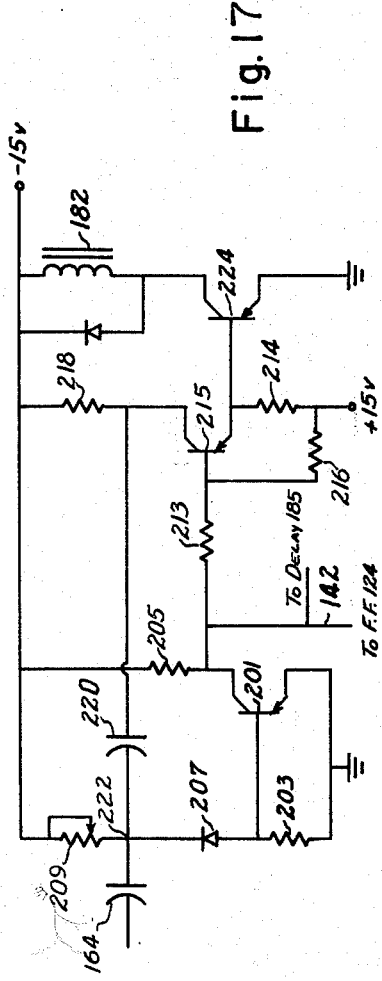

FIGURE 17 is a schematic diagram of a preferred type of timing circuit for use in the sorter control circuit.

Figure 1:
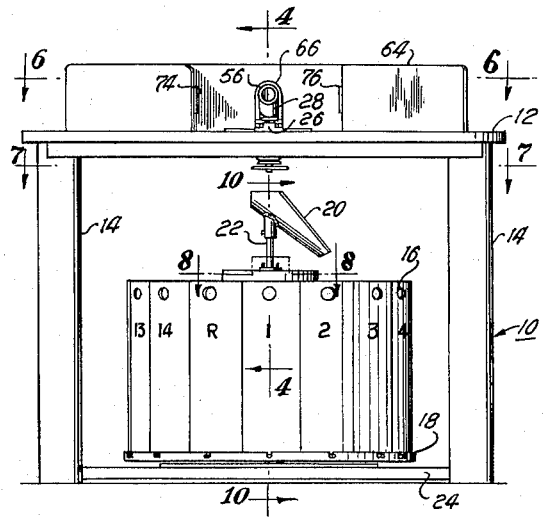
FIGURE 1 is a front elevation view of a sorter console according to the preferred embodiment of the present invention.
Figure 2:
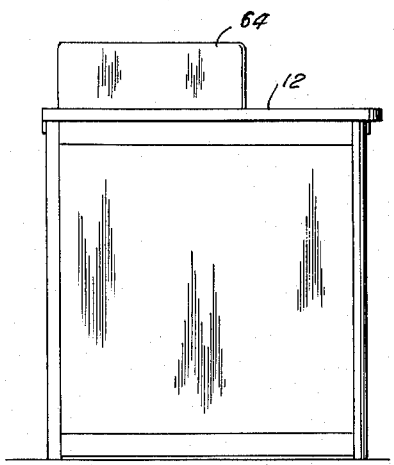
FIGURE 2 is a side elevation view of the sorter console shown in FIGURE 1.
Figure 3:
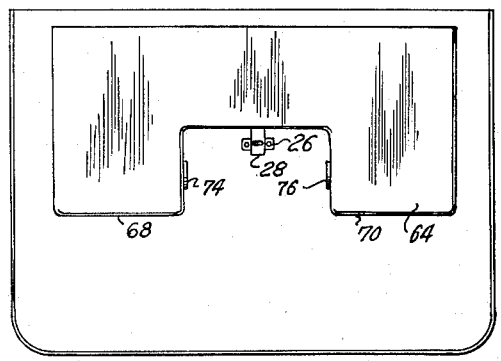
FIGURE 3 is a plan view of the sorter console shown in FIGURE 1.

Turning now to the drawings, a preferred embodiment of the invention especially adapted for use with a transistor tester will be described. A device handling apparatus and the sorting apparatus may suitably be positioned within a console table 10 of the type shown in FIGURES 1 through 3 of the drawings. In the form shown, the console table includes a horizontal, flat table portion 12 supported by a pair of legs 14 which define cabinets for containing the control circuitry and power supplies. Dependent upon the size and complexity of the testing circuitry, the testing circuitry may be packaged in the separate cabinet and electrically connected to the sorter console, or the test circuitry may be included within the legs 14.

In the form shown, the sorting mechanism is seen to comprise a plurality of bins 16 arranged in a generally circular configuration and mounted on a circular table 18. The circular table 18 may be rotatably mounted to the base plate 24 of the test console 10 to facilitate removal and placement of the bins 16. A spout 20 is rotatably mounted on a shaft 22. The shaft 22 is positioned along the axis of the cylinder defined by the plurality of bins 16. The spout 20 is aligned with a desired one of the bins 16 depending upon the angular position of the shaft 22. A motor (not shown in FIGURE 1) is provided for turning the shaft 22 to the desired angular position to direct the spout 20 to the desired one of the bins 16. Control means are provided for controlling the motor responsive to the test results obtained from the device testing apparatus. The bins 16 are marked with suitable indicia to facilitate correlation of the type of transistor or other device being tested contained within each bin.

Figure 4:
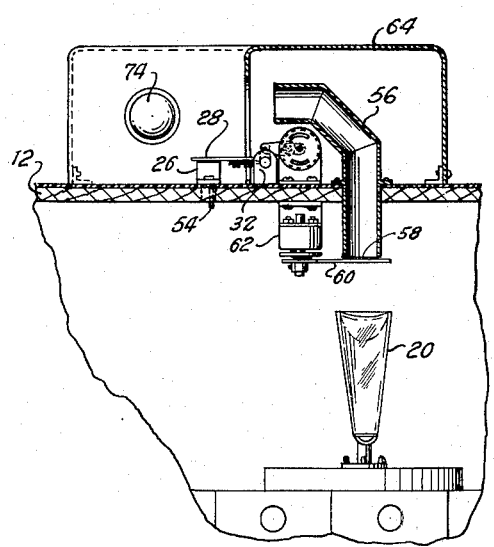
FIGURE 4 is a fragmentary view, partially in cross section, taken along line 4—4 of FIGURE 1.
Figure 5:
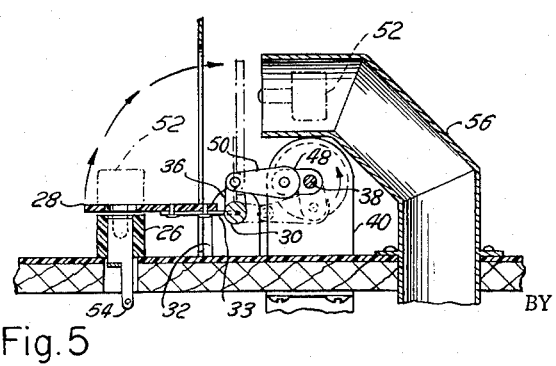
FIGURE 5 is an enlarged view similar to FIGURE 4 showing the transistor ejection mechanism of the present invention in greater detail.
Figure 6:
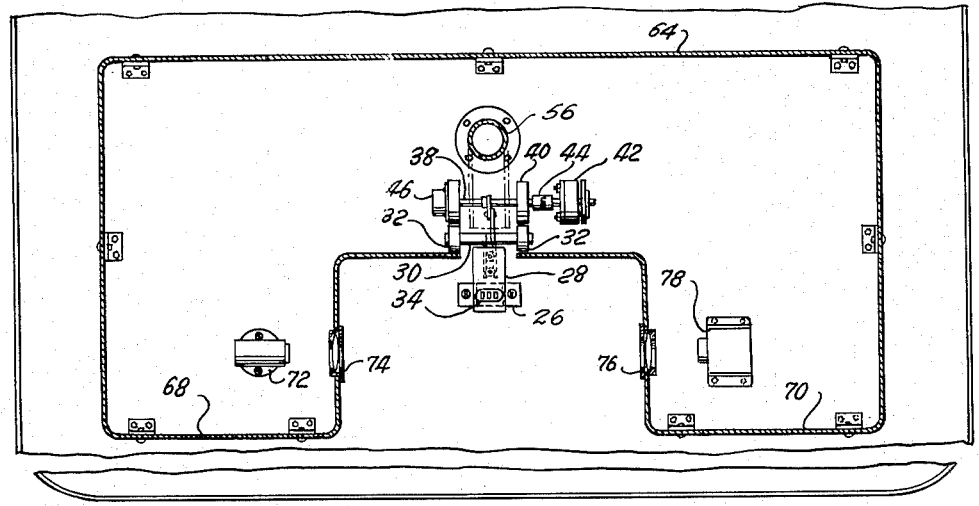
FIGURE 6 is a view, partially in cross section, taken along line 6—6 of FIGURE 1.

In the particular form of the invention described herein, the sorting mechanism is especially adapted for use in testing of transistors. As best seen in FIGURES 4, 5 and 6, a test fixture and ejection mechanism especially adapted for use in testing transistors is provided. A transistor test socket 26 of the type well known in the art is mounted in the upper surface of the table 12 of the console 10. The test socket terminals 54 are connected by a cable (not shown) to the test circuitry.

The ejection mechanism comprises a plate 28 of insulating material, suitably a plastic, attached to the shaft 30 which is rotatably supported by bearings 32. As shown in FIGURES 4, 5 and 6, the plate 28 is normally disposed in a horizontal position with the lower surface of the plate resting on or slightly above the upper surface of the transistor test socket 26. A plurality of openings 34 are provided in the plate 28. The openings 34 align with the apertures in the test socket 26 to allow transistor leads to be inserted through the plate 28 into the test socket 26 with the base of the transistor resting on the plate 28. The plate 28 is preferably mounted to the shaft 30 by a plurality of stiff rods 33, suitably of piano wire, to provide a certain degree of resiliency and reduce the shock imparted to the transistor under test at such time as the plate 28 is rotated to remove the transistor under test from the test socket 26. A linkage 36 is fixedly connected to the shaft 30 such that it extends from the shaft 30 in a plane at a right angle to the plane in which the plate 28 lies.

A second shaft 38, supported by bearings 40, is also provided. The shaft 38 is connected to a rotary solenoid 42 through a slip bushing 44. The rotary solenoid 42 is mounted to the table 12 such that when the rotary solenoid 42 is energized, the shaft 38 rotates in a counter-clockwise direction. A spring member 46 is provided for returning the shaft 38 to the position shown in FIGURES 4–6 at such time as the rotary solenoid 42 is de-energized. A linkage 48 is fixedly attached to the shaft 38 and extends outwardly from the shaft in a plane normally parallel to the plane in which the plate 28 lies. A third linkage 50 connects the linkage 36 to the linkage 48.

In operation, a transistor 52 (shown in phantom in FIGURE 5) is inserted through the openings 34 in the plate 28 into the apertures of the test socket 26 until the leads contact the terminals 54 contained within the test socket. Electrical connection is thereby provided between the transistor under test and the test circuitry. The base of the transistor 52 rests upon the upper surface of the plate 28 as shown.

Following the completion of the test on the transistor 52, the rotary solenoid 42 is energized by the control circuitry, causing the shaft 38 to rotate in a counter-clockwise direction as shown. As the shaft 38 rotates in the counter-clockwise direction, the linkage 48 will rotate through an angle of approximately 90°. The rotation of the linkage 48 connected to the linkage 36 will cause the shaft 30 and the plate 28 to rotate approximately 90° in a clockwise direction.

It will be evident by reference to FIGURE 5 that the acceleration of the plate 28 will be very low initially, removing the transistor 52 from the test socket 26 without producing undue stress on the transistor leads or subjecting the transistor to undue shock. In this connection, the pins 33 by which the plate 28 is mounted to the rod 30, provide a certain degree of flexibility, further easing the removal of the transistor from the test socket. The acceleration and the velocity of the plate 28 as it rotates in a clockwise direction will be at a maximum after the plate 28 has rotated approximately 45°. Thereafter, the angular acceleration of the plate 28 will decrease until the plate 28 is rotated approximately 90°. At this time, the position of the various elements of the ejection mechanism will be as shown in phantom in FIGURE 5 and the shaft 38 will be restrained from further rotation. The deceleration of the rotating plate 28 in conjunction with the flexibility imparted by the pins 33 mounting the plate 28 to the shaft 30 is effective to propel the transistor under test into the tube 56.

The outlet 58 of the tube 56 is covered by a plate 60 which is rotatably supported by a second rotary solenoid 62. The outlet 58 of the tube 56 is aligned with the spout 20 such that the transistor 52 will fall into the spout 20 at such time as the plate 60 swings away from the opening 58. The rotary solenoid 62 is energized by the control circuitry a predetermined time following ejection of the transistor under test from the test socket that is sufficient to allow the spout 20 to become aligned with the proper one of the bins 16.

A cover 64 is provided for enclosing the ejection apparatus, minimizing the possibility of the operator's hands or clothing becoming entangled in the linkage. As shown, an opening 66 is provided in the cover 64 through which the plate 28 projects. The opening 66 is sufficiently high to allow the plate 28 to swing to its upright position. The cover 64 includes two forwardly extending portions 68 and 70 which extend on opposite sides of the test socket 26 and define a work space.

Positioned within the forwardly extending portion 68 of the cover 64 is a light source 72. The radiation produced by the light source 72 passes through a culminating lens 74 which forms a beam of light. The beam of light passes slightly above and to the front of the test socket 28 such that an operator's hand will interrupt the beam of light as the transistor to be tested is inserted into the test socket. A second lens 76 receives the light beam and focuses onto a photocell 78.

The interruption of the light beam by the operator as the transistor is inserted causes the photocell to produce a pulse at its output. The pulse produced by the photocell is effective to initiate the test sequence. If, at any time, during the test sequence the operator interrupts the light beam, the pulse produced by the photocell responsive to the interruption of the light beam is effective to disable the test equipment and invalidate the results of the test. The importance of this last mentioned function will be appreciated when it is realized that in many instances the presence of an operator's hands or other foreign objects in the proximity of the transistor under test can adversely affect the test results and also minimizes the possibility of the operator coming into contact with the high voltages which may be present on the transistor during the test cycle.

Figure 7:
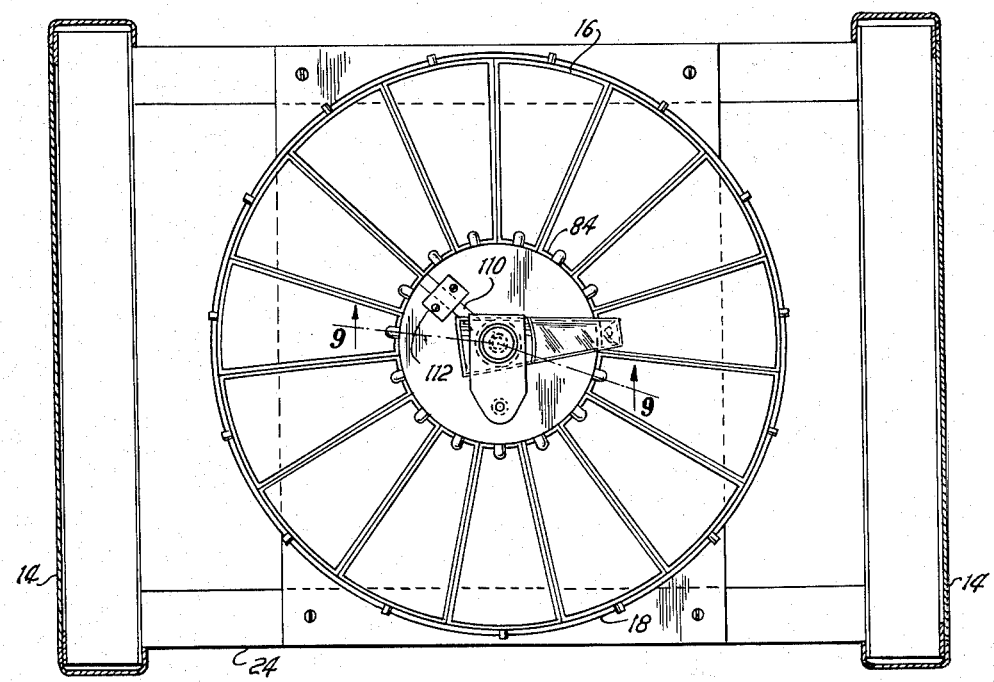
FIGURE 7 is a view, partially in cross section, taken along line 7—7 of FIGURE 1.

As mentioned earlier with reference to FIGURE 1, but is best seen by reference to FIGURE 7, the sorting apparatus provided by the present invention basically comprises a plurality of bins 16 arranged in a circular configuration. The bins 16 are positioned on a rotatable circular plate 18 about a stand 80 (FIGURE 10) which supports a motor 82 and an annular ring 84.

The circular plate 18 is rotatably mounted onto a base plate 24. Appropriate stops (not shown) are provided to limit the rotation of the circular plate 18 to one revolution in order that the cable 86 which provides electrical connection to the motor 82, the lamps 85 and the photocells 98–104, will not be damaged due to excessive rotation of the table 18. The motor 82 is of any suitable type in which the angular position of the armature and shaft can be controlled by the signal applied to the armature winding. In accordance with the preferred example of the invention, a model 2T60-6 motor manufactured by Gerald K. Heller Company was used. A plurality of pins 88 project outwardly from the annular ring 84 and a plurality of detents 90 are formed in the rim portion of the rotatable plate 18. As best seen in FIGURE 11, the bins are removable and are generally of a truncated pie-shaped configuration. A detent is provided in the upper portion of the surface of the bin which bears against the annular ring 84 and a pin 94 projects outwardly from the lower portion of the outwardly facing surface of the bin 16. The pin 94 engages one of the detents 90 formed in the rim of the rotatable table 18 and the detent 92 of the bin 16 engages one of the pins 88 which projects outwardly from the annular ring 84. The pins 88 and 94, in conjunction with the detents 90 and 92, are thus effective to position each of the bins 16 at a desired location on the table 18.

As best seen in FIGURE 8, a plurality of the lamps 85 are positioned about the upper surface of the annular ring 84 with the lens of each of the lights 85 directed inwardly. It is seen that the axis of each of the lights 85 is aligned with the center line of one of the bins 16. For reasons that will become apparent as the description of the invention unfolds, it is preferred that an odd number of bins 16 and lamps 85 be provided.

A cylindrical photocell housing 96 which supports photocells 98, 100, 102 and 104 is also provided. The photocell housing 96 is mounted on the shaft 22 at an elevation such that the photocells 98–104 and the lamps 85 are in a common plane. The light produced by each of the lamps 85 is, therefore, directed onto the photocell housing 96 and will always impinge upon at least one of the photocells 98–104. A slip ring 106 allows electrical connection to be made to the photocells 98–104 and a cover 108 is provided for preventing ambient light impinging on the photocells. To facilitate removal of the cover 108, a slot (best seen in FIGURE 7) 110 may be provided. A cover 112 is provided for sealing the slot 110 at such time as the cover 108 is installed.

Figure 13:
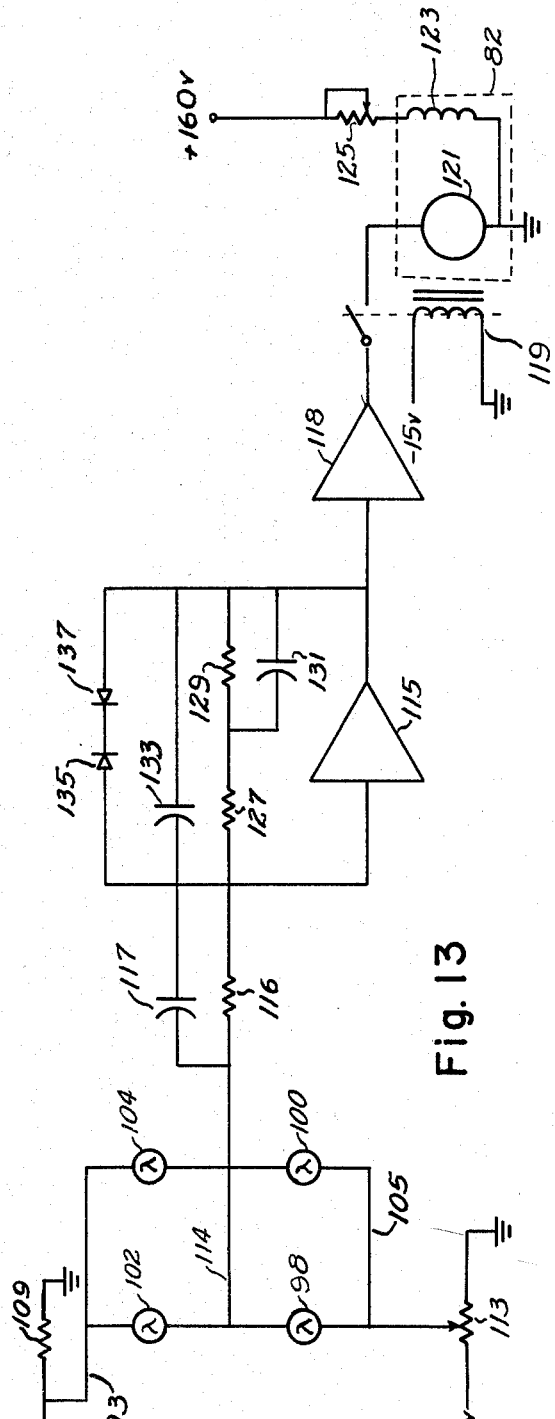
FIGURE 13 is a schematic diagram illustrating the manner in which the photocells positioned about the shaft control the position of the shaft.
Figure 14:
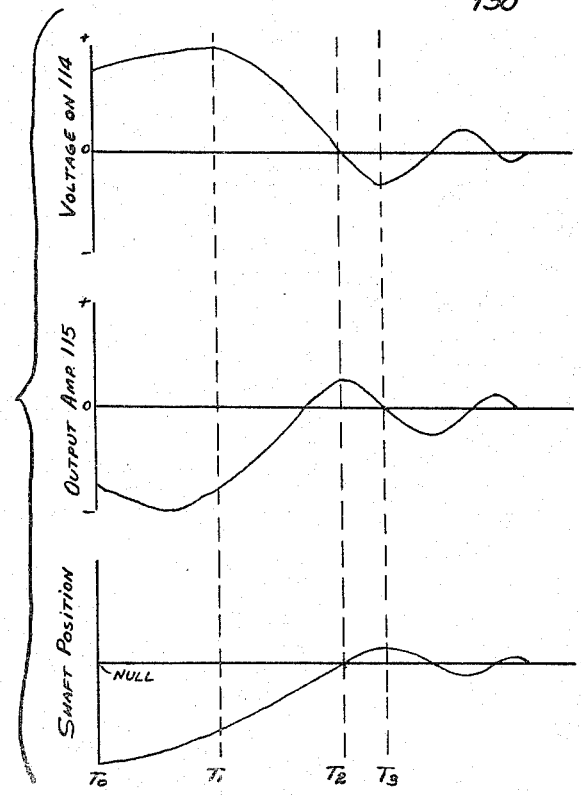
FIGURE 14 is a plurality of curves illustrating the relationship between the voltage signals present in the motor control circuit.

The operation of the sorting apparatus can best be understood by reference to FIGURES 12–14 of the drawings. As shown in FIGURES 12 and 13, one side of the photocells 98 and 100 is connected to line 105. The line 105 is connected to a source of power, suitably positive 15 volts, through a variable potentiometer 113. In similar fashion, one side of each of the photocells 102 and 104 is connected through line 103 and a voltage divider comprising resistors 105 and 107 to a source of different potential, suitably negative 15 volts. The other side of each of the photocells 98, 100, 102 and 104 is connected to line 114.

If an equal amount of light is impinging on the photocells 98 and 104 and an equal amount of light impinges on the photocells 100 and 102, the potential present on the line 114 should be zero. The variable potentiometer 113 is provided for balancing the sources of potential to obtain a null reading with each of the photocells subjected to equal amounts of light. If, on the other hand, the light shining on the photocells 98 and 100 is greater than the light impinging on the photocells 102 and 104, the potential on the line 114 will be positive. Conversely, if photocells 102 and 104 receive more light than the photocells 100 and 98, the potential on line 114 will be negative.

The potential present on the line 114 is applied to the input of the voltage amplifier 115 through a phase shifting network comprising a resistor 116 and a capacitor 117. The phase shifting network comprising the resistor 116 and the capacitor 117 is effective to cause the output of the voltage amplifier 115 to lead the signal produced on line 114 by a predetermined desired amount. The output of the voltage amplifier 115 is applied to a power amplifier 118. The amplifier 115 may be of any suitable type for obtaining the necessary voltage gain to drive the power amplifier 118. According to one specific example of the invention, the voltage amplifier 115 used was a "Philbrick K2–X" sold by Philbrick Research, Inc., of Boston, Massachusetts.

The power amplifier 118 may be of any suitable type capable of providing the power necessary to drive motor 82 when a signal produced by the voltage amplifier is impressed across it. The output of the power amplifier 118 is applied through the contacts of a motor relay 119 to the armature winding 121 of the motor 82. The field winding 123 of motor 82 is connected through a variable resistor 125 to a suitable source of potential, such as a positive 160 volts.

In operation of the sorting mechanism, one of the lamps 85, such as the lamp 85B of FIGURE 12, is energized by the test circuitry or other suitable means at the completion of the test to indicate the presence of a device having the characteristics of those collected in the bin 16 associated with the lamp 85B. The lamp 85A associated with the bin into which the last device tested was directed will always be lit and the angular position of the shaft 22 will always be such that the photocells 100 and 102 are directly opposed to the lit lamp, such as lamp 85A. As the lamp 85B is lit, the lamp 85A will be de-energized, causing the photocells 102 and 104 to receive more light than the photocells 98 and 100. The potential on the line 114 will, therefore, become negative, applying a positive potential to the armature 121 of the motor 82 and causing the shaft of the motor 82 to rotate in a clockwise direction. As the shaft 22 rotates in a clockwise direction, the photocell 104 will become farther from the lamp 85B and photocells 102 and 100 will become closer. At such time as the lamp 85B is centered between the photocells 100 and 102, the photocells 98 and 100 will each receive the same amount of energy as the photocells 102 and 104, causing the potential on line 114 to be zero. As the signal is no longer applied to the armature winding of the motor 82, the shaft will cease to rotate. If the photocells 98 and 100 receive more light, as by the lamp 85C being lit, the potential on the line 114 will become positive, causing the motor to rotate in a counter-clockwise direction until the lamp 85C is centered between the photocells 100 and 102.

Thus, it is seen that if an excess of light impinges on photocell 98 or 100, the potential on line 114 will be positive, causing the armature of the motor to rotate in a counter-clockwise direction, whereas if a greater amount of light impinges on the photocells 102 or 104, the potential on line 114 will be negative, causing the armature of the motor 82 to rotate in a clockwise direction. The maximum angle of rotation for the photocells 100 and 102 to a position in opposed relationship to the lit lamp will always be less than 180°. It is also apparent that the signals produced by the light impinging on the photocells will cause a null voltage to appear on the line 114 if the light is centered between the photocells 100 and 102 or between the photocells 98 and 104. By providing an odd number of lamps 85, the possibility of the lit lamp being centered between the photocells 98 and 100 is virtually eliminated. In this connection, it will be noted that if one of the lamps 98 and 104 receives more light than the other, the direction of rotation of the shaft will always be away from the null position, whereas if one of the lamps 100 and 102 receives more light than the other, the direction of rotation is toward the null position.

It will be appreciated that in the absence of suitable damping, the angular position of the shaft 22 would approach a null point but continue to oscillate in a relatively narrow arc. In accordance with this preferred embodiment of the present invention, the desired damping is accomplished electronically. As mentioned before, the potential present on line 114 is applied to the voltage amplifier 115 through a parallel connected resistor 116 and capacitor 117 which causes the potential at the output of the voltage amplifier 115 to lead the signal present on the line 114 a predetermined amount, suitably in the order of 30° at the natural resonant frequency of the system. The resistor 116 in conjunction with the resistors 127 and 129 provide feedback for the amplifier 115 and thereby determine the D.C. gain of the amplifier.

The capacitor 131, connected in shunt with the resistor 129, provides a low impedance path for the A.C. signals produced as the position of the shaft oscillates back and forth to either side of the lamp which is lit. The capacitor 131 is, therefore, effective to reduce the alternating current feedback of the amplifier and thereby reduce the gain of the amplifier and assist in stopping the oscillation of the oscillatory movement of the shaft 22. The capacitor 133 is effective as a high frequency filter to prevent any high frequency signals which may be induced in the control system adversely affecting the operation of the amplifier 115.

If the sorting mechanism provided by the present invention is to function or have a capability of functioning as a high speed sorter, it is desirable that the positioning of the shaft 22 occur in the minimal possible time. Accordingly, zener diodes 135 and 137 are provided for limiting the output voltage of the amplifier 115 and thereby limiting the time required for the voltage produced by the output of the voltage amplifier 115 to vary from maximum positive or negative output to zero output.

Operation of the circuitry shown in FIGURES 12 and 13 will now be explained with reference to FIGURES 14A–14C. As shown, at time T–0, when the lamp 85B first becomes lit, a potential is produced on the line 114 of an amplitude dependent upon the angular position of the shaft 22 with relation to the lamp 85B. If the angular position of the shaft 22 and the lamp 85B is as shown in FIGURE 12, a portion of the light will impinge on the photocell 98 initially and as the shaft rotates in a clockwise direction, the potential on the line 114 will increase slightly as the photocell 98 is moved away from the field of radiation of the lamp 85B. As the shaft 22 continues to rotate in a clockwise direction at time $T_1$, light from the lamp 85B will begin to impinge on the photocell 100, decreasing the potential of the line 114 and at the input of the voltage amplifier 115. Due to the leading phase angle of the output of the voltage amplifier 115, the output of the voltage amplifier 115 will change polarity and begin to go positive prior to the time that the photocell 85B is centered between the photocells 100 and 102. At time $T_2$, the position of the shaft 22 will be such that the lamp 85B is centered between the photocells 100 and 102 and the potential on the line 114 will be zero. At this time, the output of the amplifier 115 will be positive, tending to cause the motor to rotate in a counter-clockwise direction. The force produced by the positive voltage at the output of amplifier 110 will be effective to overcome the inertia of the shaft 22 and cause the shaft to begin to turn in a counter-clockwise direction. As the inertia of the shaft 22 and the motor 82 causes the shaft to rotate in a clockwise position past the null position, the potential on line 114 will become negative. However, due to the phase difference between the input and output of the amplifier 115, the output of the amplifier 115 will be positive. At time $T_3$, the clockwise rotation of the shaft 22 will end and the shaft will begin to rotate in a counter-clockwise direction due to the positive voltage produced at the output of amplifier 115. As the shaft begins to rotate in the counter-clockwise direction, the output of the amplifier 115 becomes negative again, tending to cause the shaft to rotate in a clockwise direction. As the voltage applied to the armature of the motor will always be such as to oppose the rotation of the shaft away from the null position, it has been found that any tendency to oscillate will be effectively damped in one or two oscillations.

The operation of this preferred embodiment of the sorting apparatus in combination with a transistor tester will now be explained with reference to FIGURES 15–17 of the drawings. Referring particularly to FIGURE 15 of the drawings, the electrical connections between the transistor 52 under test, the tester 120 and the control circuitry 138 is diagrammatically illustrated. As shown, the transistor 52 is inserted into test socket 26 which connects to the tester 120. The beam of light passing between the lamp 72 and the photocell 78 is temporarily interrupted as the transistor 52 is inserted into the test socket 26, causing a positive going pulse to be applied to the control circuitry 138. As will be explained in greater detail with reference to FIGURE 16, the control circuitry 138 produces a positive going pulse responsive to the interruption of the light beam which is applied to the tester 120 through line 132 for initiating the test sequence. At the end of the test sequence, the tester 120 applies a negative going pulse to the control circuitry 138 through line 134. Responsive to the negative going signal, the control circuitry produces a signal which is effective to cause the one of the lights 85 to be lit, dependent upon the parameters of the device tested, and which causes the transistor under test to be ejected from the test socket and dropped into the chute 20.

The lamp 72 receives power from a suitable source of potential, such as −15 volts. The intensity of the light produced by the lamp 72 can be controlled by rheostat 128. The source of potential is also connected through rheostat 130 and the photocell 78 to the control circuitry 138. The light produced by the lamp 72 is formed into a beam by culminating lens 74 and then focused onto the photocell 78 by the lens 76 as described previously. At such time as the operator interrupts the beam of light in the course of inserting the transistor 52 into the test socket 26, the amount of light impinging on the photocell 78 will change, causing the resistance of the photocell 78 to change and produce a positive going pulse.

As best understood with reference to FIGURE 16 of the drawings, the positive going pulse produced upon interruption of the light beam is applied to an amplifier 200 which is suitably a conventional saturated type amplifier. The amplifier 200 will produce a negative going pulse at its output responsive to any interruption of the light beam.

The timer 202 produces a positive going delay pulse suitably 200 milliseconds long responsive to an output from the amplifier 200. If the operator removes her hand from the light beam during the 200 millisecond delay pulse, no further action will occur as the delay pulse is effective to back bias the diode 204 and prevent a set pulse being applied from the amplifier 200 to the testing flip-flop 124. The set pulse is produced at such time as the output of the amplifier 200 goes positive when the operator removes her hand from the light beam.

At the end of the 200 millisecond delay pulse, the output of the timer 202 will go negative, forward biasing the diode 204. If the operator's hands remain in the path of the light for more than 200 milliseconds, at such time as she removes her hands from the beam of light, the output of the amplifier 200 will return to zero, producing a positive going set pulse which is applied through the capacitor 206 to the testing flip-flop 124, turning the testing flip-flop 124 on.

As the testing flip-flop 124 turns on, it produces a positive going signal which is applied to the tester 120 through line 132. The positive going signal applied to the tester 120 is effective to actuate the necessary relays to start the test sequence. At the end of the test sequence, the tester 120 produces a positive going pulse which is applied through line 134, capacitor 208, and diode 210 to the input of a read timer 212. If the testing flip-flop 124 is in the on condition, the positive going pulse produced at its output is applied through resistor 211 to the anode of diode 210, allowing the diode 210 to conduct the positive going pulse from the tester. The read timer produces a negative going pulse at its output which is applied along line 140 to the binary flip-flop 150 and along line 126 to the tester 120. Responsive to the negative going pulse from the read timer 212, the tester 120 applies a ground to one of the lamps 85 through cable 136.

The binary flip-flop 150 produces a positive going pulse at its output responsive to the negative going pulse from the read timer 212. The positive going pulse produced at the output of the binary flip-flop 150 is applied through the capacitor 160, diode 162 and capacitor 164 to a pull timer 166.

A source of positive potential is applied through the resistor 168 to the cathode of the diode 162, rendering the diode 162 normally non-conductive, the amplitude of the positive potential applied to the cathode of the diode 162 being greater than the amplitude of the pulse produced by the binary flip-flop 150. The source of positive potential is also connected to the emitter of a PNP transistor 170 and through a biasing resistor 172 to the base of the transistor 170. The collector of the transistor 170 is connected through a resistor 174 to the anode of the diode 162. The base of the transistor 170 is connected through the filaments of each of the parallel connected lamps 85 and cable 136 to the test circuitry 120.

At such time as the test circuitry 120 provides a ground for one of the lamps 85, current will flow through the emitter to the base of the transistor 170 as well as through resistor 172 and through the lamp 85 to ground, causing transistor 170 to conduct. When the transistor 170 conducts, the potential between the collector and the emitter drop to a very low potential, removing the reverse bias from the diode 162 and permitting the pulse produced by the flip-flop 150 to be applied to the pull timer 166. From the above, it is evident that if none of the lamps 85 are lit, the diode 162 will be back biased a sufficient amount to prevent the application of a control pulse to the pull timer 166 and the transistor under test will not be removed from the test socket and the test flip-flop 124 will not be reset.

The collector of the transistor 170 is also connected through a resistor 176 and a lamp 178 to ground, causing the lamp 178 to be lit when the transistor 170 is conducting. If the lamp 178 is lit, it will indicate that one of the lamps 85 is receiving a ground from the test circuitry and that the test circuitry and control mechanism is operating satisfactorily.

The winding 180 of motor control relay 119 is also energized by the transistor 170 being in its conductive state from the source of positive 15 volts potential. If one of the lamps is not lit, power will not be applied to the armature winding of the motor 82.

For a predetermined period of time following the application of the pulse to the pull timer 166 from the flip-flop 150, the timer 166 provides a ground to the winding 182 of the rotary solenoid 42, causing the transistor under test to be ejected from the test socket as described previously with reference to FIGURES 4 and 5. The pull timer 166 also produces a pulse which is applied to a drop timer 184 through time delay 185 and through line 142 to the test flip-flop 124. The pulse applied to the test flip-flop 124 resets flip-flop 124 preparatory to the next device being inserted into the test socket.

The drop timer 184 provides a ground which is effective to energize the winding 186 of the rotary solenoid 62, allowing the transistor to fall from the tube 56 into the rotatable spout 20. The time delay 185 is provided to insure that time is provided for the spout 20 to be properly positioned before the transistor drops. The drop timer 184 also produces a pulse which is applied along line 188 to the input of the binary flip-flop 150, resetting the binary flip-flop 150.

The tester 120 and control circuitry 138 are then in the proper condition for the beginning of the next test sequence at such time as a transistor is inserted into the test socket 26.

It will be seen that when the testing flip-flop 124 is on, the anode of the diode 220 will be slightly positive due to the drop across the resistor 222 which connects the input of the interlock flip-flop 224 to the output of the testing flip-flop 124. If the beam of light impinging on the photocell 78 is interrupted when the testing flip-flop 124 is in its on condition (condition at which the test sequence is in process), the negative pulse produced at the output of the amplifier 200 will be applied through the diode 220 to the input of the interlock flip-flop 224. The interlock flip-flop 224 will produce a negative going voltage at its output. The negative going pulse produced at the output of the interlock flip-flop is applied to the testing flip-flop 124, causing it to be reset. When the testing flip-flop is reset, it will put out a negative going signal, ending all test functions in the tester and resetting the testing memory. The negative going signal from interlock flip-flop 224 is also applied through resistor 226 to the input of amplifier 200. The negative signal produced by the interlock flip-flop loads the input of the amplifier 200, preventing the photocell 78 having any effect on the amplifier circuit. Thus, while the interlock flip-flop 224 is actuated, the interruption of the light impinging on the photocell 78 will not have any effect on the circuitry.

The interlock flip-flop 224 can only be returned to its normally off condition by means of the reset button 228 which is effective to ground the output of the interlock flip-flop, thereby removing the negative bias from the connection between the photocell and the amplifier and also removing the D.C. reset signal from the testing flip-flop 124. Upon pressing the reset switch, the circuitry returns to normal and the next interruption of the light beam will initiate a new sequence of test.

The importance of the delay timer associated with the amplifier 200 will become evident in view of the description of the operation of the interlock flip-flop. Thus, if the delay timer were not provided and the finger or other portion of the operator should interrupt the light beam momentarily prior to the time that the operator's hand interrupted the light beam in the process of inserting the transistor to be tested, either test voltages would be present in the contacts of the test socket at the time the transistor was inserted or the interlock flip-flop would be actuated, disabling the test set. The cooperation between the delay timer 202 and the amplifier 200 insures that the operator must purposely interrupt the light beam with a solid movement of her hand in order that the tester be actuated. As the duration of the pulse produced by the delay timer 202 is considerably less than that required for even the most experienced operator to insert the transistor into the test socket, the provision of the delay timer 202 does not adversely affect the speed of the operation of the tester, but provides a means for optimizing the operation of the photocell 78 as a control for the tester.

The binary flip-flop 150 and test flip-flop 154 are suitably Eccles-Jordan flip-flops of the type that is well known in the art. The pull timer 166, drop timer 184, delay timer 202 and read pulse timer 212 are suitably of the type shown in FIGURE 17, although many other circuits will perform satisfactorily.

As shown in FIGURE 17, the preferred type of timer comprises a first transistor 201 whose emitter is connected to ground. The base of transistor 201 is connected to ground through a biasing resistor 203 and its collector is connected to a source of negative potential through resistor 205. The base of transistor 201 is also connected to the source of negative potential through diode 207 and variable resistor 209. The transistor 201 is biased to normally be conductive and line 142 will be very near ground potential.

The collector of transistor 201 is connected through a coupling resistor 213 to the base of transistor 215. A source of positive potential is connected to the emitter of transistor 215 through resistor 214 and through resistor 216 to the base of transistor 215. The collector of transistor 215 is connected through resistor 218 to the source of negative potential and through capacitor 220 to the juncture 222 of diode 207 and variable resistor 209. The juncture 222 is connected to the capacitor 164. The transistor 215 is biased to be normally non-conductive.

The positive going pulse produced by the binary flip-flop 150 is applied through the capacitor 164 to the timer 166 as mentioned previously. The positive pulse is effective to cut off the normally conductive transistor 201, applying a negative going pulse to line 142 and to the base of transistor 215. The negative going pulse applied to the base of transistor 215 will cause transistor 215 to conduct. The potential at the collector of transistor 215 will rise to near zero from a negative potential. The capacitor 220 is charged, maintaining the positive potential at the base of transistor 201, causing transistor 201 to remain off until capacitor 220 discharges. The discharge time of capacitor 220 and hence the time transistor 201 remains off is controlled by variable resistor 209.

The emitter of transistor 215 is connected to the base of transistor 224. The emitter of transistor 224 is connected to ground and the collector of transistor 224 is connected to the source of negative potential through the winding 182 of rotary solenoid 42. When transistor 215 conducts, the transistor 224 will turn on, allowing, the collector current of transistor 224 to energize the rotary solenoid 42.

At the end of the desired time interval, the capacitor 220 will have discharged sufficiently to allow the transistor 201 to assume its normally conductive state, cutting off transistor 215 and 224 and de-energizing the winding 182 of rotary solenoid 42.

Although the invention has been described with reference to one preferred embodiment, many changes and modifications will become apparent to those skilled in the art in view of the description. The invention is, therefore, to be limited only as necessitated by the scope of the appended claims.

What I claim is:

1. A sorting mechanism for storing a plurality of items having different characteristics according to the classification of each item that comprises:
    (a) A plurality of storage bins;
    (b) Item directing means for directing the items to one of the storage bins in accordance with the classification of the items;
    (c) A plurality of lamps capable of emitting radiation of a desired frequency range, each of said lamps being associated with a respective one of said storage bins;
    (d) Means for energizing one of said lamps responsive to the indication of the presence of an item of one classification; and
    (e) Means responsive to the presence of radiation emitted by one of said lamps for positioning the item handling means to direct said item of one classification to the storage bin associated with said one of said lamps, said means responsive including a first photocell array and a second photocell array which are sensitive to radiation of the frequency range emitted by said lamps and further including a housing supporting said first and second photocell arrays with each of said arrays facing in a substantially different direction whereby at least one of said arrays will receive radiation emitted by any of said lamps.

2. A sorting mechanism as defined in claim 1 further including mounting means for mounting said item directing means in fixed relationship to said housing whereby when radiation from a lamp impinges upon both of said arrays with substantially equal intensity, said item directing means is aligned with the bin associated with said lamp.

3. A sorting mechanism as defined in claim 2 wherein said means responsive further includes drive means for moving said mounting means in one direction until said radiation impinges upon both arrays with substantially equal intensity responsive to a greater intensity of radiation impinging on one photocell array and for moving said mounting means in another direction until said radiation impinges on both arrays with substantially equal intensity responsive to a greater intensity of radiation impinging on the other photocell array.

4. A sorting mechanism as defined in claim 3 wherein said first array comprises a plurality of photocells connected in parallel, said second array comprises a plurality of photocells connected in parallel, and further including means connecting said first array and said second array in series between a source of positive potential and a source of negative potential, and means for varying one of said potentials to produce a null voltage at the juncture of said first array and said second array when the intensity of radiation impinging on both arrays is substantially equal, a positive voltage at the juncture when the one array receives a greater intensity of radiation and a negative voltage at the juncture when the other array receives a greater intensity of radiation.

5. A sorting mechanism as defined in claim 4 wherein said drive means comprises an electric motor and an amplifier means for driving said motor in accordance with the polarity of the potential present at the juncture of said first array and said second array.

6. A sorting mechanism as defined in claim 5 wherein said bins are arranged in a circular configuration and said mounting means comprises a shaft supported along the axis of the cylinder defined by said bins.

7. Apparatus for use with a tester capable of testing devices and providing an indication of the classification of each device tested that comprises a socket for receiving a device to be tested and connecting said device to said tester, means for forming a beam of light in close proximity to said socket whereby said beam of light is temporarily interrupted as the device is inserted in said test socket, means responsive to the end of the interruption of said beam of light for initiating the test sequence, a plurality of bins arranged in a generally circular configuration, a shaft mounted along the axis of the cylinder defined by said bins, a housing carried by said shaft, a lamp associated with each of said bins positioned to direct light onto said housing, a selected one of said lamps being lit responsive to the tester providing an indication of the presence of a device having a particular classification, a first photocell array and a second photocell array positioned in said housing, said first and second arrays facing in substantially different directions whereby light produced by any of said lamps will impinge upon at least a portion of one of said arrays, each of said arrays comprising at least two photocells connected in parallel, means connecting said first array and said second array in series between a source of positive potential and a source of negative potential, means for adjusting the potential at the juncture of said first array and said second array to zero when the light impinging on the photocell in the first array is substantially equal to the light impinging on the photocells in the second array, a motor for rotating said shaft, amplifier means responsive to the presence of a potential at said juncture for applying power to said motor to cause said motor to rotate in a direction dependent upon the polarity of the potential at said juncture until the light from said selected one of said lamps impinges with equal intensity on the photocells in said first array and said second array, ejecter means responsive to the end of the test for ejecting said device from said socket, and a chute mounted on said shaft for receiving the device ejected from said socket, said chute being positioned on said shaft for alignment with the bin associated with the selected lamp when said shaft is in a null position whereby said device is directed into the bin containing devices having said particular classification.

8. Apparatus as defined in claim 7 wherein said means responsive to the interruption of said beam of light is effective only if said beam of light is interrupted for at least a minimum period of time.

9. Apparatus as defined in claim 8 further including means effective responsive to the interruption of said beam of light during a test sequence for stopping the test sequence.

References Cited in the file of this patent
UNITED STATES PATENTS

| | | |
|---|---|---|
| 1,384,046 | Carrino | July 12, 1921 |
| 1,938,104 | Jennings | Dec. 5, 1933 |
| 1,962,742 | Jongedyk | June 12, 1934 |
| 2,530,526 | Keller | Nov. 21, 1950 |
| 2,589,561 | Mackenchie | Mar. 18, 1952 |
| 2,603,433 | Nosker | July 15, 1952 |
| 3,106,290 | McGrath | Oct. 8, 1963 |